US00RE48258E

(19) United States
(12) Reissued Patent
Hoerich et al.

(10) Patent Number: US RE48,258 E
(45) Date of Reissued Patent: Oct. 13, 2020

(54) UPSAMPLING USING OVERSAMPLED SBR

(71) Applicant: DOLBY INTERNATIONAL AB, Amsterdam Zuidoost (NL)

(72) Inventors: Holger Hoerich, Fürth (DE); Tobias Friedrich, Nuremberg (DE)

(73) Assignee: Dolby International AB, Amsterdam Zuidoost (NL)

(21) Appl. No.: 16/222,960

(22) Filed: Dec. 17, 2018

Related U.S. Patent Documents

Reissue of:
(64) Patent No.: 9,530,424
Issued: Dec. 27, 2016
Appl. No.: 14/357,188
PCT Filed: Nov. 12, 2012
PCT No.: PCT/EP2012/072395
§ 371 (c)(1),
(2) Date: May 8, 2014
PCT Pub. No.: WO2013/068587
PCT Pub. Date: May 16, 2013

U.S. Applications:
(60) Provisional application No. 61/558,519, filed on Nov. 11, 2011.

(51) Int. Cl.
*G10L 19/032* (2013.01)
*G10L 19/24* (2013.01)
(Continued)

(52) U.S. Cl.
CPC ..... *G10L 19/032* (2013.01); *G10L 19/0204* (2013.01); *G10L 19/24* (2013.01); *G10L 19/265* (2013.01); *G10L 19/167* (2013.01)

(58) Field of Classification Search
CPC ..... G10L 19/265; G10L 19/032; G10L 19/24; G10L 19/0204; G10L 19/167
See application file for complete search history.

(56) References Cited

U.S. PATENT DOCUMENTS 7,328,162 B2 2/2008 Ekstrand
7,433,817 B2 10/2008 Kjoerling
(Continued)

FOREIGN PATENT DOCUMENTS

CN 1849647 10/2006
CN 101192407 6/2008
(Continued)

OTHER PUBLICATIONS

Anonymous, "Study on ISO/IEC 23003-3:201x/DIS of Unified Speech and Audio Coding," 96 MPEG Meeting; Mar. 21, 2011-Mar. 25, 2011, Geneva, Motion Picture Expert Group or ISO/IEC JTC1/SC29/WG11, No. N12013, dated Apr. 22, 2011, 274 pages.
(Continued)

*Primary Examiner* — Ovidio Escalante

(57) ABSTRACT

An encoder (250) comprises a core encoder (252) for encoding a low frequency component of the audio signal at the signal sampling rate (fs_in) and a spectral band replication-referred to as SBR-encoding unit (153, 254) for determining a plurality of SBR parameters. A plurality of the SBR parameters is determined such that a high frequency component of the audio signal can be approximated based on the low frequency component of the audio signal and the plurality of SBR parameters. A multiplexer (155) is adapted to generate an overall bitstream comprising the core encoded bitstream, the plurality of SBR parameters and an indication of one or more SBR encoder settings applied by the SBR encoder (153, 254); wherein the generated overall bitstream does not indicate that the core encoded bitstream has been determined by encoding the low frequency component at the signal sampling rate (fs_in).

22 Claims, 3 Drawing Sheets

(51) Int. Cl.

| | |
|---|---|
| ***G10L 19/02*** | (2013.01) |
| ***G10L 19/26*** | (2013.01) |
| ***G10L 19/16*** | (2013.01) |

(56) References Cited

U.S. PATENT DOCUMENTS

| | | | | |
|---|---|---|---|---|
| 8,180,818 | B2 | 5/2012 | Purnhagen | |
| 8,260,607 | B2 | 9/2012 | Villemoes | |
| 2006/0280271 | A1* | 12/2006 | Oshikiri | G10L 21/038 375/355 |
| 2007/0067162 | A1* | 3/2007 | Villemoes | G10L 19/008 704/206 |
| 2008/0249765 | A1 | 10/2008 | Schuijers | |
| 2009/0063140 | A1 | 3/2009 | Villemoes | |
| 2009/0228285 | A1* | 9/2009 | Schnell | G10L 19/008 704/500 |
| 2010/0023322 | A1 | 1/2010 | Schnell | |
| 2010/0063827 | A1 | 3/2010 | Gao | |
| 2011/0004479 | A1 | 1/2011 | Ekstrand | |
| 2011/0022400 | A1 | 1/2011 | Kimura | |
| 2011/0054911 | A1* | 3/2011 | Baumgarte | G10L 19/24 704/500 |
| 2011/0173006 | A1 | 7/2011 | Nagel | |
| 2012/0002818 | A1* | 1/2012 | Heiko | G10L 19/008 381/22 |
| 2013/0226570 | A1* | 8/2013 | Multrus | G10L 19/0204 704/219 |
| 2013/0332176 | A1* | 12/2013 | Setiawan | G10L 19/012 704/500 |
| 2014/0016785 | A1* | 1/2014 | Neuendorf | G10L 19/008 381/22 |

FOREIGN PATENT DOCUMENTS

| | | |
|---|---|---|
| CN | 102194457 | 9/2011 |
| EP | 2172931 | 4/2010 |
| JP | 2008-107415 | 5/2008 |
| JP | 2011-034046 | 2/2011 |
| JP | 2011-100159 | 5/2011 |
| JP | 2011-520146 | 7/2011 |
| JP | 2011-527447 | 10/2011 |
| WO | WO 2010/094710 | 8/2010 |
| WO | WO 2010/120924 | 10/2010 |
| WO | WO 2010/081892 | 11/2010 |
| WO | WO 2011/047886 | 4/2011 |
| WO | WO 2011/047887 | 4/2011 |
| WO | WO 2011/110499 | 9/2011 |
| WO | WO 2011/128342 | 10/2011 |

OTHER PUBLICATIONS

Extended European Search Report in European Application No. 19167651.9, dated Aug. 20, 2019, 9 pages.

Schuijers, et al., "Low Complexity Parametric Stereo Coding" Audio Engineering Society, Convention Paper 6073, Presented at the 116th Convention, May 8-1, 2004, Berlin, Germany. p. 11.

Ehret, A. et al "aacPlus, only a Low-bitrate Codec?" Coding Technologies, Nuemberg DE, 11th AES Convention SF, Oct. 2004.

Kjorling, K. et al "Signalling, Single/Dual Rate and Downsampling Capabilities within SBR" MPEG Meeting, Mar. 2003, ISO/IEC JTC1/SC29/WG11.

Wolters, M. et al "A Closer Look into MPEG-4 High Efficiency AAC" AES, presented at the 115th Convention, Oct. 10-13, 2003, New York, USA, vol. 115.

ISO/IEC 14496-3 Information Technology—Coding of Audio Visual Objects—Audio; Publication date: Aug. 26, 2009.

* cited by examiner

Output Sampling Frequencies

| OUT / IN | AAC only | | | AAC & HE-AAC | | | Dolby Pulse | | | AAC & HE-AAC | | |
|---|---|---|---|---|---|---|---|---|---|---|---|---|
| | 8000 | 11025 | 12000 | 16000 | 22050 | 24000 | 32000 | 44100 | 48000 | 64000 | 88200 | 96000 |
| 8000 | X | Y | Y | (X) | (X) | (X) | - | - | - | - | - | - |
| 11025 | X | X | Y | Y | (X) | (X) | - | - | - | - | - | - |
| 12000 | X | X | X | Y | Y | (X) | - | - | - | - | - | - |
| 16000 | X | X | X | X | Y | Y | (X) | (X) | (X) | - | - | - |
| 22050 | X | X | X | X | X | Y | Y | (X) | (X) | - | - | - |
| 24000 | X | X | X | X | X | X | Y | Y | (X) | - | - | - |
| 32000 | X | X | X | X | X | X | X | Y | Y | - | - | - |
| 44100 | X | X | X | X | X | X | X | X | Y | - | - | - |
| 48000 | X | X | X | X | X | X | X | X | X | - | - | - |
| 64000 | - | - | - | - | - | - | - | - | - | - | - | - |
| 88200 | - | - | - | - | - | - | - | - | - | - | - | - |
| 96000 | X | X | X | X | X | X | X | X | X | - | - | X |

Input Sampling Frequencies

*FIG. 4*

UPSAMPLING USING OVERSAMPLED SBR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[This application] *The present application is a reissue application of U.S. application Ser. No. 14/357,188, which was filed on May 8, 2014, and issued as U.S. Pat. No. 9,530,424 on Dec. 27, 2016, which is the National Stage of International Application No. PCT/EP2012/072395, filed on Nov. 12, 2012, and which* claims priority to U.S. Provisional Application No. 61/558,519, filed Nov. 11, 2011[, which is hereby incorporated by reference in its entirety]. *The entire contents of each of the foregoing are incorporated herein by reference.*

TECHNICAL FIELD

The present document relates to audio encoding and decoding. In particular, the present document relates to audio encoding/decoding which involves spectral band replication (SBR) techniques.

BACKGROUND

HFR (High Frequency Reconstruction) techniques, such as Spectral Band Replication (SBR), allow for a significant improvement of the coding efficiency of traditional perceptual audio codecs. In combination with MPEG-4 Advanced Audio Coding (AAC), HFR forms a very efficient audio codec, which is already in use within the XM Satellite Radio system and Digital Radio Mondiale, and also standardized within 3GPP, DVD Forum and others. The combination of AAC and SBR is called aacPlus. It is part of the MPEG-4 standard where it is referred to as the High Efficiency AAC Profile (HE-AAC). In general, HFR technologies can be combined with any perceptual audio codec in a back and forward compatible way, thus offering the possibility to upgrade already established broadcasting systems like the MPEG Layer-2 used in the Eureka DAB system. HFR transposition methods can also be combined with speech codecs to allow wide band speech at ultra low bit rates.

The basic idea behind HRF (or SBR in particular) is the observation that there usually exists a strong correlation between the characteristics of the high frequency range of a signal (referred to as the high frequency component) and the characteristics of the low frequency range of the same signal (referred to as the low frequency component). Thus, a good approximation for the representation of the original input high frequency range of a signal can be achieved by a signal transposition from the low frequency range to the high frequency range.

Audio signals may be provided at different sampling rates. Users of an audio codec typically want to be able to encode audio signals at various input sampling rates. In a similar manner, users of an audio codec want to be able to select various sampling rates at an output of the audio decoder. By way of example, a user makes use of an audio codec to encode uncompressed audio signals (e.g. from a compact disk, from way-files, or from media libraries). These uncompressed audio signals may be at various input sampling rates such as 24, 32, 44.1 or 48 kHz which are supported by various rendering devices (TV, mp3 players, smart phones, etc.).

As such, the audio codec should be able to handle various sampling rates at the input to the encoder and should be able to provide various sampling rates at the output of the decoder. In particular, the audio codec should be able to convert the sampling rates of audio signals at the input and at the output of the audio codec in a flexible and processor efficient manner. By way of example, a user may select an output sampling rate of 48 kHz vs. and input sampling rate of 24 kHz. In this case, the audio codec should be able to provide a sampling rate conversion (upsampling by a factor of two) which requires low computational complexity. In particular, the computational complexity related to the upsampling should be reduced (or, if possible, the necessity of explicit upsampling, using a conventional resampler, should be removed completely).

The present document describes audio codecs which make use of high frequency reconstruction, notably audio codecs using SBR, which are configured to perform sampling rate conversion of audio signals at reduced computational complexity.

SUMMARY

According to an aspect, an encoder for an audio signal at a signal sampling rate is described. The encoder is an SBR based encoder. As such, the encoder comprises a core encoder adapted to encode a low frequency component of the audio signal at the signal sampling rate, thereby generating a core encoded bitstream. In other words, the core encoder operates directly on the audio signal at the signal sampling rate without prior downsampling to a lower sampling rate. The core encoder encodes the low frequency component of the audio signal, wherein the low frequency component typically comprises the frequencies of the audio signal below an SBR start frequency. The core encoder may be adapted to perform e.g. advanced audio encoding (AAC), or MPEG-1 or MPEG-2 Audio Layer III (i.e. mp3) encoding.

In addition, the encoder comprises a spectral band replication (SBR) encoding unit which is adapted to determine a plurality of SBR parameters subject to one or more SBR encoder settings. Typically, the plurality of SBR parameters is determined such that a high frequency component of the audio signal at the signal sampling rate can be approximated (or reconstructed) based on the low frequency component of the audio signal and the plurality of SBR parameters. In other words, the plurality of SBR parameters are determined such that a corresponding SBR decoder is enabled to determined a reconstructed high frequency component from the (reconstructed) low frequency component and the plurality of SBR parameters. Typically, the high frequency component comprises frequencies of the audio signal above the SBR start frequency.

The plurality of SBR parameters typically comprises parametric data which describes a spectral envelope of the high frequency component in conjunction with the low frequency component. As such, the plurality of SBR parameters may allow to approximate a spectral envelope of the high frequency component from spectral data comprised within the low frequency component. The one or more SBR encoder settings are typically provided to a corresponding decoder in a so called SBR header.

Furthermore, the encoder comprises a multiplexer adapted to generate an overall bitstream comprising the core encoded bitstream, the plurality of SBR parameters and an indication of the one or more SBR encoder settings applied by the SBR encoder. The overall bitstream may be transmitted to a corresponding decoder (e.g. via a wireless or wireline network) or the overall bitstream may be stored in a data file. Typically, the overall bitstream is provided in an appropriate data format, e.g. the overall bitstream may be encoded in an MP4 format, a 3GP format, a 3G2 format, or a Low-overhead MPEG-4 Audio Transport Multiplex (LATM) format. In more general terms, the overall bitstream may be encoded (by the encoder, e.g. by the multiplexer) in a format which uses explicit SBR signaling. There may be two types of explicit SBR signaling, a backward compatible and a non-backward compatible explicit SBR signaling (as described in ISO/IEC 14496-3, section 1.6.5.2 Implicit and explicit signaling of SBR). The specification ISO/IEC 14496-3, section 1.6.5.2 Implicit and explicit signaling of SBR, describes how SBR may be signaled. This specification (in particular, the cited section) is incorporated by reference. The relevant information indicating whether Oversampled SBR is used or not may be stored in a data entity of the overall bitstream, e.g. the AudioSpecificConfig( ). In the AudioSpecificConfig( ), two different sampling rate values may be conveyed, the samplingFrequency and the extensionSamplingFrequency. The ratio between the two different sampling rates may indicate the usage of Oversampled SBR. For Oversampled SBR, the extensionSamplingFrequency is typically twice the samplingFrequency (wherein the sampling Frequency typically corresponds to the sampling rate of the core encoder).

The multiplexer (or more generally, the encoder) may be adapted to generate standard conform bitstreams (e.g. the MP4FF in ISO/IEC 14496-12 which is incorporated by reference).

The encoder may be adapted to ensure that the generated overall bitstream does not indicate that the core encoded bitstream has been determined by encoding the low frequency component at the signal sampling rate. In other words, the overall bitstream may be silent with regards to the fact that the core encoder has not applied a downsampling prior to encoding the audio signal, but has core encoded the audio signal directly at the signal sampling rate. Alternatively or in addition, the encoder may be adapted to ensure that the generated overall bitstream indicates that the core encoded bitstream has been determined by encoding the low frequency component at a sampling rate lower than the signal sampling rate, e.g. at half of the signal sampling rate. In the context of explicit SBR signaling, this may be achieved by providing appropriate information within the AudioSpecificConfig( ) (as specified e.g. in ISO/IEC 14496-3, Table 1.1.3-Syntax of AudioSpecificConfig( ) which is incorporated by reference). In particular, the encoder (e.g. the core encoder in conjunction with the SBR encoder which together may be referred to as the high efficiency (HE) encoder) may be adapted to ensure that the ratio of the value extensionSamplingFrequency over the value of samplingFrequency is different to two, e.g. smaller than two, e.g. equal to one. As such, the encoder may be adapted to generate an overall bitstream which indicates that the encoder operates in a dual-rate mode. The modification of the extensionSamplingFrequency may be performed by the core encoder in conjunction with the SBR encoder, As such, in an embodiment, the HE encoder provides a particular value for the extensionSamplingFrequency (e.g. an extensionSamplingFrequency which is equal to the samplingFrequency) to the multiplexer and the multiplexer includes this value into the AudioSpecificConfig( ) of the overall bitstream.

In the case of a high efficiency advanced audio coding (HE-AAC) encoder, the encoder may be specified as a HE-AAC encoder operating in an oversampled SBR mode. In more general terms, one may refer to an SBR based encoder operating in an oversampled SBR mode. This encoder is adapted to generate an overall bitstream comprising the core encoded bitstream, the plurality of SBR parameters and an indication of the one or more SBR encoder settings used to determine the SBR parameters. Furthermore, the encoder may be adapted to ensure that the generated overall bitstream does not indicate (or is silent about the fact) that the encoder operates in the oversampled SBR mode. Alternatively or in addition, the encoder may be adapted to ensure that the generated overall bitstream indicates that the encoder operates in the dual-rate SBR mode. As indicated above, this may be achieved by providing appropriate data within the AudioSpecificConfig( ).

The encoder may make use of a plurality of parameter tuning tables to define the one or more SBR encoder settings in dependence of one or more encoder constraints or conditions (also referred to as criteria or input parameters). Typically, the plurality of parameter tuning tables is determined based on perceptual measurements, in order to enable a perceptually optimized performance of the encoder under the corresponding encoder condition.

As such, the SBR encoding unit may be adapted to determine the one or more SBR encoder settings from one of a plurality of parameter tuning tables. As indicated above, each of the plurality of parameter tuning tables may define the one or more SBR encoder settings in dependence of one or more encoder conditions. In other words, a parameter tuning table (comprising the one or more SBR encoder settings) may be defined for a particular combination of the one or more encoder conditions. The one or more encoder conditions may comprise any one or more of: a lower target bit rate, a higher target bit rate, a sampling rate used by the core encoder, a number of channels comprised within the audio signal, an indication of the use of an oversampled encoding mode instead of a dual-rate mode.

As outlined above, in the oversampled encoding mode, the core encoder encodes the low frequency component of the audio signal at the signal sampling rate. On the other hand, in the dual-rate encoding mode, the core encoder encodes the low frequency component of the audio signal at a reduced sampling rate, e.g. at half the signal sampling rate. The encoder may be adapted to ensure that the overall bitstream does not indicate that the encoder has used the oversampled encoding mode to generate the overall bitstream.

Furthermore, the encoder may be adapted to select an appropriate parameter tuning table from the plurality of parameter tuning tables, and to use the one or more SBR encoder settings defined in the appropriate parameter tuning table for determining the plurality of SBR parameters. Typically, an encoder which operates in an oversampled encoding mode uses parameter tuning tables which are defined for the encoder condition indicating the use of the oversampled encoding mode. In order to ensure the determination of an appropriate plurality of SBR parameters in the upsampling scenario described in the present document, the encoder (and in particular, the SBR encoding unit) may be adapted to use a dual-rate parameter tuning table from the plurality of parameter tuning tables. The dual-rate parameter tuning table is defined for the encoder condition indicating the use of the dual-rate encoding mode.

In order to reduce the complexity of the encoder, the encoder may be adapted to modify at least one of the one or more SBR encoder settings defined by the dual-rate parameter tuning table. In particular, the dual-rate parameter tuning table may be defined for the (further) encoder condition that the sampling rate used by the core encoder corresponds to the signal sampling rate. Furthermore, the dual-rate parameter tuning table may define a dual-rate SBR stop frequency as one of the one or more SBR parameter settings. The encoder (and in particular, the SBR encoding unit) may be adapted to use an SBR stop frequency for determining the plurality of SBR parameters, wherein the SBR stop frequency is smaller than the dual-rate SBR stop frequency. As such, the encoder is adapted to focus the SBR encoding on frequency bands of the audio signal which comprise signal energy.

In addition, the dual-rate parameter tuning table may define a dual-rate SBR start frequency as one of the one or more SBR encoder settings. The encoder (and in particular, the SBR encoding unit) may be adapted to use an SBR start frequency for determining the plurality of SBR encoder settings, wherein the SBR start frequency corresponds to the dual-rate SBR start frequency.

The encoder may further comprise an upsampling unit adapted to upsample the audio signal at a first sampling rate to provide the audio signal at the signal sampling rate, wherein the first sampling rate is smaller than the signal sampling rate. In other words, an upsampling unit may be used to upsample the audio signal from a first sampling rate to the signal sampling rate. The encoder may then be adapted to determine the SBR stop frequency which is used to SBR encode the audio signal based on the first sampling rate. In particular, the encoder may select the SBR stop frequency to be close to half of the first sampling rate.

It should be noted that the SBR stop frequency is typically selected on a pre-determined frequency grid (e.g. a grid provided by a quadrature mirror filter bank). Furthermore, there may be restrictions on the selection of the SBR stop frequency with regards to the value of the SBR start frequency. By way of example, it may be imposed by the SBR encoder that the SBR stop frequency is at least a predetermined number of frequency bands (e.g. three QMF bands) above the SBR start frequency. In such cases, the encoder may select the SBR stop frequency to be as close as possible to half of the first sampling rate or to half of the signal sampling rate (while taking into account the minimum required distance to the SBR start frequency and/or while taking into account the pre-determined frequency grid).

The SBR encoding unit typically comprises an analysis filter bank (e.g. a quadrature mirror filter bank, QMF) adapted to provide a plurality of subband signals from the audio signal. Furthermore, the SBR encoding unit may comprise an SBR encoder adapted to assign a first subset of the plurality of subband signals to the low frequency component; assign a second subset of the plurality of subband signals to the high frequency component; and determine the plurality of SBR parameters from the first and second subsets.

As indicated above, the one or more SBR encoder settings typically comprise an SBR start frequency, wherein the SBR encoding unit is restricted to determine the plurality of SBR parameters for frequencies of the high frequency component which are at or above the SBR start frequency. Furthermore, the one or more SBR encoder settings typically comprise an SBR stop frequency, wherein the SBR encoding unit is restricted to determine the plurality of SBR parameters for frequencies of the high frequency component which are at or below the SBR stop frequency.

According to a further aspect, an audio codec adapted to upsample an audio signal at a signal sampling rate to a higher sampling rate (e.g. to twice the signal sampling rate or more) is described. The audio codec is an SBR audio codec and comprises an encoder for the audio signal at the signal sampling rate and a corresponding decoder. The encoder comprises a core encoder adapted to encode a low frequency component of the audio signal at the signal sampling rate, thereby generating a core encoded bitstream. Furthermore, the encoder comprises an SBR encoding unit adapted to determine a plurality of SBR parameters subject to one or more SBR encoder settings. The plurality of SBR parameters is determined such that a high frequency component of the audio signal at the signal sampling rate can be approximated based on the low frequency component of the audio signal and the plurality of SBR parameters. In addition, the encoder comprises a multiplexer adapted to generate an overall bitstream comprising the core encoded bitstream, the plurality of SBR parameters and an indication of the one or more SBR encoder settings.

The corresponding decoder is adapted to receive the generated overall bitstream. The decoder comprises a core decoder adapted to generate a reconstructed low frequency component at the signal sampling rate from the core encoded bitstream. The core decoder may be a corresponding decoder to the core encoder (e.g. AAC or mp3). Furthermore, the decoder comprises an analysis filter bank (e.g. a QMF filter bank) adapted to generate N (e.g. N=32) subband signals of the reconstructed low frequency component. In addition, the decoder comprises an SBR decoder adapted to generate N subband signals of a reconstructed high frequency component based on the N subband signals of the reconstructed low frequency component, based on the plurality of SBR parameters and based on the one or more SBR encoder settings. The decoder makes use of a synthesis filter bank (e.g. a QMF filter bank) comprising 2N frequency bands, to generate a reconstructed audio signal at twice the signal sampling rate from the N subband signals of the reconstructed low frequency component and from the N subband signals of the reconstructed high frequency component.

In other words, the SBR based codec (e.g. the HE-AAC codec) may be adapted to upsample an audio signal at a signal sampling rate. The SBR based codec comprises an SBR based encoder (e.g. an HE-AAC encoder) operating in an oversampled SBR mode. The SBR based encoder (e.g. the HE-AAC encoder) is adapted to generate an overall bitstream comprising a core encoded bitstream, a plurality of SBR parameters and an indication of the one or more SBR encoder settings used to determine the SBR parameters. Furthermore, the codec comprises an SBR based decoder (e.g. a HE-ACC decoder) operating in a dual-rate mode. The SBR based decoder (e.g. the HE-ACC decoder) is adapted to generate a reconstructed audio signal at twice the signal sampling rate from the overall bitstream.

According to another aspect, a method for encoding an audio signal at a signal sampling rate is described. The method may comprise encoding a low frequency component of the audio signal at the signal sampling rate, thereby generating a core encoded bitstream. In addition, the method may comprise determining a plurality of SBR parameters subject to one or more SBR encoder settings. The plurality of SBR parameters is determined such that a high frequency component of the audio signal at the signal sampling rate can be approximated based on the low frequency component of the audio signal and the plurality of SBR parameters. Furthermore, the method comprises generating an overall bitstream comprising the core encoded bitstream, the plurality of SBR parameters and an indication of the one or more SBR encoder settings. The method ensures that the generated overall bitstream does not indicate that the core encoded bitstream has been determined by encoding the low frequency component at the signal sampling rate.

According to another aspect, a method for upsampling an audio signal at a signal sampling rate is described. The method may comprise encoding a low frequency component of the audio signal at the signal sampling rate, thereby generating a core encoded bitstream. The method may proceed in determining a plurality of SBR parameters subject to one or more SBR encoder settings. The plurality of SBR parameters is determined such that a high frequency component of the audio signal at the signal sampling rate can be approximated based on the low frequency component of the audio signal and the plurality of SBR parameters. The method may comprise generating a reconstructed low frequency component at the signal sampling rate from the core encoded bitstream. In addition, the method may comprise generating N subband signals of the reconstructed low frequency component, and generating N subband signals of a reconstructed high frequency component based on the N subband signals of the reconstructed low frequency component, based on the plurality of SBR parameters and based on the one or more SBR encoder settings. Eventually, the method generates a reconstructed audio signal at twice the signal sampling rate from the N subband signals of the reconstructed low frequency component and from the N subband signals of the reconstructed high frequency component.

According to a further aspect, a software program is described. The software program may be adapted for execution on a processor and for performing the method steps outlined in the present document when carried out on a computing device.

According to another aspect, a storage medium is described. The storage medium may comprise a software program adapted for execution on a processor and for performing the method steps outlined in the present document when carried out on a computing device.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. Furthermore, all aspects of the methods and systems outlined in the present document may be arbitrarily combined. In particular, the features of the claims may be combined with one another in an arbitrary manner.

SHORT DESCRIPTION OF THE DRAWINGS

The invention is explained below in an exemplary manner with reference to the accompanying drawings, wherein FIG. 1a illustrates an example block diagram of an HE-AAC codec in a dual-rate mode;

FIG. 4 shows an example chart of possible combinations of input sampling rates and output sampling rates.

DETAILED DESCRIPTION

Figure 1A:
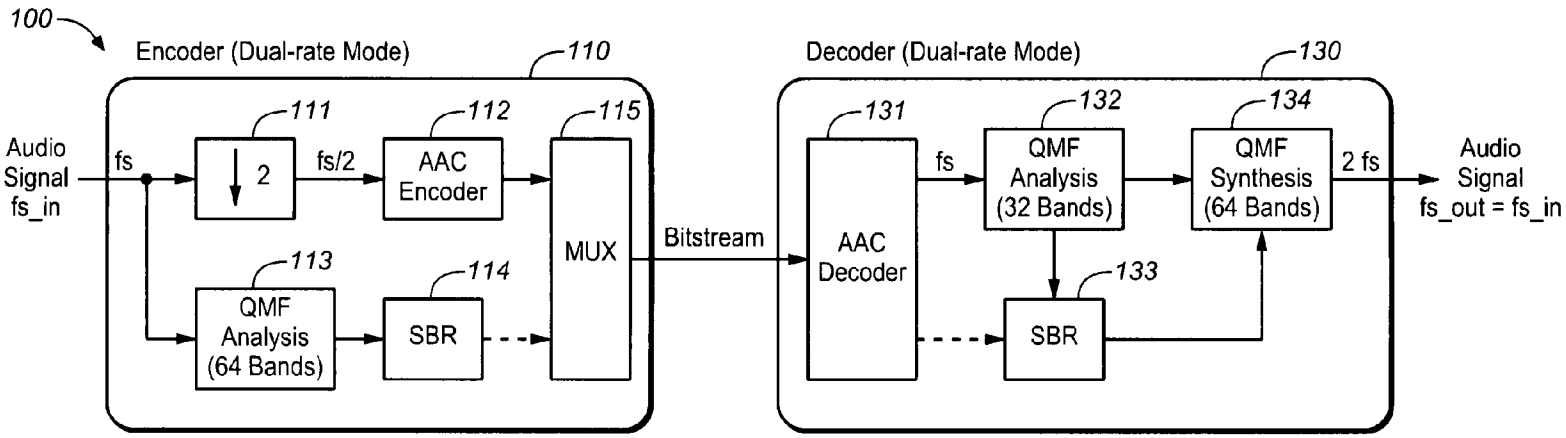
FIG. 1b illustrates an example block diagram of an HE-AAC codec in an oversampled SBR mode.

As outlined above, the present document relates to audio codecs which make use of high frequency reconstruction techniques such as SBR. FIGS. 1a and b illustrate two example SBR based audio codecs used in HE-AAC version 1 and HE-AAC version 2 (i.e. HE-AAC comprising parametric stereo (PS) encoding/decoding of stereo signals). FIG. 1a shows a block diagram of an HE-AAC codec 100 operating in the so called dual-rate mode, i.e. in a mode where the core encoder 112 in the encoder 110 works at half the sampling rate than the SBR encoder 114. At the input of the encoder 110, an audio signal at the input sampling rate fs=fs_in is provided. The audio signal is then downsampled by a factor two in the downsampling unit 111 in order to provide the low frequency component of the audio signal. Typically, the downsampling unit 111 comprises a low pass filter in order to remove the high frequency component prior to downsampling (thereby avoiding aliasing). The downsampling unit 111 provides a low frequency component at a reduced sampling rate fs/2=fs_in/2. The low frequency component is encoded by a core encoder 112 (e.g. an AAC encoder) to provide an encoded bitstream of the low frequency component.

It should be noted that in the present document and the corresponding Figures, a distinction is made between the internal sampling rate (denoted fs) as used by the encoder and/or the decoder based on the sampling rate of the signal or bitstream received at the input of the encoder and/or decoder, and the input/output sampling rates (denoted fs_in/fs_out, respectively) of the audio signal. In particular, the internal sampling rate fs is typically set equal to the sampling rate of the audio signal and/or the bitstream received at the encoder and/or the decoder.

The high frequency component of the audio signal is encoded using SBR parameters. For this purpose, the audio signal is analyzed using an analysis filter bank 113 (e.g. a quadrature mirror filter bank (QMF) having e.g. 64 frequency bands). As a result, a plurality of subband signals of the audio signal is obtained, wherein at each time instant t (or at each sample n), the plurality of subband signals provides an indication of the spectrum of the audio signal at this time instant t. The plurality of subband signals is provided to the SBR encoder 114. The SBR encoder 114 determines a plurality of SBR parameters, wherein the plurality of SBR parameters enables the reconstruction of the high frequency component of the audio signal from the (reconstructed) low frequency component at the corresponding decoder. The SBR encoder 114 typically determines the plurality of SBR parameters such that a reconstructed high frequency component which is determined based on the plurality of SBR parameters and the (reconstructed) low frequency component approximates the original high frequency component. For this purpose, the SBR encoder 114 may make use of an error minimization criterion (e.g. a mean square error criterion) based on the original high frequency component and the reconstructed high frequency component.

The plurality of SBR parameters and the encoded bitstream of the low frequency component are joined within a multiplexer 115 to provide an overall bitstream, e.g. an HE-AAC bitstream, which may be stored or which may be transmitted. As will be outlined below, the overall bitstream also comprises information regarding SBR encoder settings which were used by the SBR encoder 114 to determine the plurality of SBR parameters.

A corresponding decoder 130 may generate an uncompressed audio signal at the sampling rate fs_out=fs_in from the overall bitstream. The core decoder 131 separates the SBR parameters from the encoded bitstream of the low frequency component. Furthermore, the core decoder 131 (e.g. an AAC decoder) decodes the encoded bitstream of the low frequency component to provide a time domain signal of the reconstructed low frequency component at the internal sampling rate fs of the decoder 130. The reconstructed low frequency component is analyzed using an analysis filter bank 132. It should be noted that in the dual-rate mode the internal sampling rate fs is different at the decoder 130 from the input sampling rate fs_in and the output sampling rate fs_out, due to the fact that the AAC decoder 131 works in the downsampled domain, i.e. at an internal sampling rate fs which is half the input sampling rate fs_in and half the output sampling rate fs_out.

The analysis filter bank 132 (e.g. a quadrature mirror filter bank having e.g. 32 frequency bands) typically has only half the number of frequency bands compared to the analysis filter bank 113 used at the encoder 110. This is due to the fact that only the reconstructed low frequency component and not the entire audio signal has to be analyzed. The resulting plurality of subband signals of the reconstructed low frequency component are used in the SBR decoder 113 in conjunction with the received SBR parameters to generate a plurality of subband signals of the reconstructed high frequency component. Subsequently, a synthesis filter bank 134 (e.g. a quadrature mirror filter bank of e.g. 64 frequency bands) is used to provide the reconstructed audio signal in the time domain. Typically, the synthesis filter bank 134 has a number of frequency bands which is double the number of frequency bands of the analysis filter bank 132. The plurality of subband signals of the reconstructed low frequency component may be fed to the lower half of the frequency bands of the synthesis filter bank 134 and the plurality of subband signals of the reconstructed high frequency component may be fed to the higher half of the frequency bands of the synthesis filter bank 134. The reconstructed audio signal at the output of the synthesis filter bank 134 has an internal sampling rate of 2fs which corresponds to the signal sampling rates fs_out=fs_in.

Figure 1B:
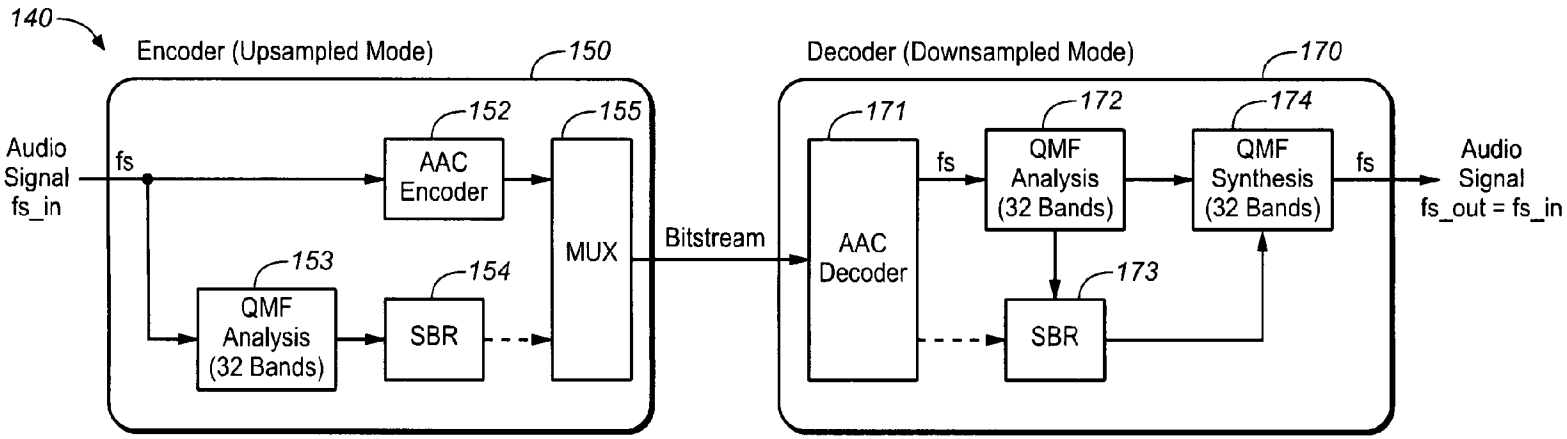

FIG. 1b illustrates the block diagram of an HE-AAC codec 140 used in an oversampled SBR mode. The HE-AAC codec 140 in an oversampled SBR mode operates largely in the same manner as the HE-AAC codec 110 in a dual-rate mode, with the difference that the encoder 150 does not comprise a downsampling unit 111. As a result, the core encoder 152 is enabled to operate on the entire bandwidth of the audio signal, thereby providing additional flexibility regarding the bandwidth of the low frequency component encoded by the core decoder 152 and the bandwidth of the high frequency component encoded using SBR encoder 154. In other words, depending on the available bit rate of the overall bitstream at the output of the encoder 150, the core decoder 152 may select the bandwidth of the low frequency component. The remaining bandwidth of the audio signal is attributed to the high frequency component and encoded using the SBR encoder 154. The transition frequency between the low frequency component and the high frequency component may be referred to as the cross over frequency. Due to the lack of a downsampling unit 111, the core encoder 152 works at a higher sampling rate, i.e. at the internal sampling rate fs=fs_in, and is provided with an input signal having a higher time resolution. This is beneficial for encoding signal peaks or transients (e.g. caused by short attacks).

On the other hand, the encoder 150 typically uses a lower frequency resolution for determining the SBR parameters than the encoder 110 of the HE-AAC codec in dual-rate mode. This reduced frequency resolution may be sufficient to process the high frequency component having a reduced bandwidth (compared to the bandwidth of the high frequency component in the case of the HE-AAC codec in dual-rate mode). In the encoder 150 an analysis filter bank 153 (e.g. a quadrature mirror filter bank of e.g. 32 frequency bands) is used to provide a plurality of subband signals of the audio signal. The SBR encoder 154 uses the plurality of subband signals to generate a plurality of SBR parameters which—in conjunction with the plurality of subband signals attributed to the low frequency components—approximates the plurality of subband signals attributed to the high frequency component. A multiplexer 155 is used to combine the encoded bitstream of the low frequency component provided by the core encoder 152 and the plurality of SBR parameters to provide an overall bitstream which may be stored or transmitted. In addition, the overall bitstream may comprise an indication of the SBR encoder settings which have been used by the SBR encoder 154 to generate the plurality of SBR parameters. In particular, the overall bitstream may comprise an indication that HE-AAC encoding in oversampled SBR mode has been used.

At the decoder 170, the overall bitstream is split up into the encoded bitstream of the low frequency component and the plurality of SBR parameters. The encoded bitstream of the low frequency component is decoded into a time domain reconstructed low frequency component using a core decoder 171 (e.g. an AAC decoder). The reconstructed low frequency component is passed to an analysis filter bank 172 (e.g. a quadrature mirror filter bank having e.g. 32 frequency bands) to provide a plurality of subband signals of the reconstructed low frequency component. Typically, the analysis filter bank 172 has the same number of frequency bands as the analysis filter bank 153 used at the encoder 150. This is due to the fact that the decoder 170 does not know a priori which fraction of the overall signal bandwidth has been attributed to the low frequency component and which fraction has been attributed to the high frequency component.

The plurality of subband signals are passed to the SBR decoder 173 where the plurality of SBR parameters are used to generate a plurality of subband signals of the reconstructed high frequency component. The plurality of subband signals of the reconstructed low frequency component and the plurality of subband signals of the reconstructed high frequency component are assigned to respective frequency bands of a synthesis filter bank 174 (e.g. a quadrature mirror filter bank having e.g. 32 frequency bands) to provide the time domain reconstructed audio signal having an internal sampling rate fs which corresponds to the signal sampling rates fs_out=fs_in. The number of frequency bands of the synthesis filter bank 174 typically corresponds to the number of frequency bands of the analysis filter bank 153 used at the encoder 150.

SBR based codecs 100 in a dual-rate mode and SBR based codecs 140 in an oversampled SBR mode typically make use of a plurality of parameter tuning tables which define a number of SBR encoder settings as a function of input parameters (or criteria or conditions). The input parameters or conditions typically comprise the type of core encoder used (AAC in case of a HE-AAC codec, but when using mp3-pro, mp3 may be used as a core encoder).

a lower bit rate limit (indicating a lower bit rate which should not be undercut).

a higher bit rate limit (indicating a higher bit rate which should not be exceeded).

a binary flag indicating the use of HE-AAC in the oversampled SBR mode (or the use of HE-AAC in the dual-rate mode) (also referred to as an indication for bUse_downsampled mode).

a sampling rate used by the core encoder.

a number of audio channels of the audio signal to be encoded (e.g. a stereo signal having two audio channels, or a 5.1 surround sound audio signal having 5 audio channels and an additional LFE (Low Frequency Effect) channel).

Some or all of the above mentioned input parameters define a particular parameter tuning table which comprises and defines some or all of the following SBR encoder settings:

SBR start frequency (also referred to as SBR startBandFrequency) (which indicates the lower frequency limit or the lower frequency band of the high frequency component). The SBR start frequency is part of the SBR header transmitted to the corresponding decoder. For details see ISO/IEC 14496-3, Table 4.63—Syntax of sbr_header( ) wherein the SBR start frequency is called bs_start_freq. This document is incorporated by reference. The SBR start frequency specifies the upper frequency limit up to which the audio signal is encoded using the core encoder. The SBR start frequency defines (in conjunction with the xOverBand) a lower frequency limit or the lower frequency band of the audio signal at and above which the audio signal is encoded using SBR encoding. More precisely, the xOverBand (referred to as bs_xover_band in the above mentioned standard) defines an offset to the SBR start frequency and thereby determines the actual SBR range. In the majority of cases the offset is 0, such that the SBR start frequency actually indicates the lower frequency limit or the lower frequency band of the audio signal at and above which the audio signal is encoded using SBR encoding.

SBR start frequency for speech configurations (which indicates the SBR start frequency for speech audio signals). Typically, it is a user of the encoder which informs the encoder that the audio signal which is to be encoded is a speech audio signal. If so, the SBR start/stop frequencies for speech configurations are chosen and conveyed inside the SBR header.

SBR stop frequency (also referred to as SBR stopBandFrequency) (which indicates the upper frequency or the upper frequency band for SBR encoding). The SBR stop frequency is part of the SBR header (see ISO/IEC 14496-3, Table 4.63—Syntax of sbr_header( )) and referred to as Bs_stop_freq. SBR parameters are only determined for frequency bands of the high frequency component which lie within the frequency interval defined by the SBR start frequency and the SBR stop frequency. Frequencies above the SBR stop frequency are not considered in the SBR encoding.

SBR stop frequency for speech configurations (which indicates the SBR stop frequency for speech audio signals).

various noise related settings such as a number of noise bands (Part of the SBR header (see ISO/IEC 14496-3, Table 4.63—Syntax of sbr_header( ), referred to as bs_noise_bands)), a noiseFloorOffset, or a noiseMaxLevel. These noise related settings may be used to specify the noise which is added to the reconstructed high frequency component to improve the perceptual quality of the high frequency component.

stereo mode (which e.g. indicates the use of PS encoding of a stereo signal or the encoding of the left and right signal of the stereo audio signal). More specifically, the "stereo mode" decides if stereo coupling for SBR is used or not.

Scaling of the frequency band. This parameter is part of the SBR header (see ISO/IEC 14496-3, Table 4.63—Syntax of sbr_header( )) and referred to as bs_freq_scale. The scaling of the frequency band indicates the number of bands per octave for SBR. This may be necessary for generating the frequency band table in the SBR encoder and decoder. These bands are used to apply scaling operations, noise substitutions, missing harmonic insertion, inverse filtering etc. (see ISO/IEC 14496-3, Table 4.105—bs_freq_scale for further details, which is incorporated by reference).xOverBand (i.e. the SBR transition frequency) which is part of the SBR header (see ISO/IEC 14496-3, Table 4.63—Syntax of sbr_header( ), called bs_xover_band).

Typically, there are different parameter tuning tables for the HE-AAC codec 100 in the dual-rate mode (the flag for oversampled SBR is not set) and for the HE-AAC codec 140 in the oversampled SBR mode (the flag for oversampled SBR is set). For the following reasons, this is particularly relevant for the SBR start frequency and for the SBR stop frequency. As can be seen in FIGS. 1a and b, the core encoder 112 of the HE-AAC codec 100 in dual-rate mode works at half the sampling rate compared to the HE-AAC codec 140 in oversampled SBR mode (for identical audio signals at the input). As such, a parameter tuning table which has been defined for the dual-rate mode (i.e. the flag for oversampled SBR is not set) typically has a different ratio of SBR start/stop frequencies over core encoder sampling rate than a parameter tuning table which has been defined for the oversampled SBR mode (i.e. the flag for oversampled SBR is set).

Some or all of the above mentioned SBR encoder settings (or indications thereof) are provided from the encoder 110, 150 to the respective decoder 130, 170, e.g. in a transmitted bitstream or in an audio file. In particular, the encoders 110, 150 may provide indications of the SBR start frequency, the SBR stop frequency, the number of noise bands, the noiseFloorOffset, the noiseMaxLevel, the use of the stereoMode, the scaling of the frequency bands (bs_freq_scale) and/or the xOverBand to the corresponding decoder 130, 170. In addition, an encoder 150 operating in oversampled SBR mode may provide an indication for bUse_downsampled mode, i.e. an indication that the encoder 150 has worked in oversampled SBR mode, to the decoder such that at the decoder side the appropriate decoder 170 in oversampled SBR mode is selected. As previously mentioned, this may be indicated via the extensionSamplingFrequency in the AudioSpecificConfig( ). As such, the respective decoder 130, 170 does not need to know all the details regarding the exact parameter tuning tables and possibly other parameters which were used at the encoder to encode an audio signal. The decoder can be a generic, e.g. standardized, decoder which decodes the received overall bitstream solely based on the indications of a limited number of SBR encoder settings received within the overall bitstream.

Figure 2:
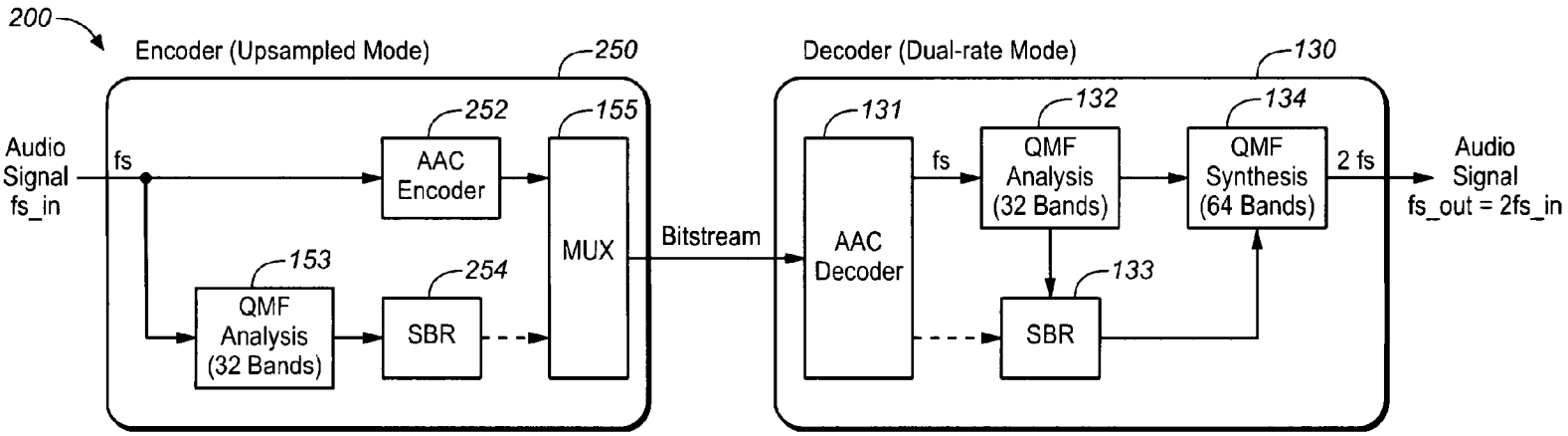
FIG. 2 illustrates an example block diagram of an HE-AAC codec providing for an inherent upsampling.

As has been indicated above, it may be desirable to provide conversions between the sampling rate fs_in of the audio signal at the input and the sampling rate fs_out of the audio signal at the output of a codec 100, 140 in an efficient manner. It is proposed in the present document to provide an upsampling by a factor two (or more) by combining an encoder 150 of the HE-AAC codec 140 in oversampled SBR mode with a decoder 130 of an HE-AAC codec 100 in dual-rate mode. Such a configuration 200 which combines a modified encoder 250 in oversampled mode with a decoder in dual-rate mode is illustrated in FIG. 2. As can be seen from FIG. 2, the encoder 250 does not perform a downsampling of the low frequency component and therefore provides an overall bitstream representative of a time domain signal at a sampling rate of fs=fs_in. The decoder 130 receives the overall bitstream and inherently performs an upsampling by the factor two. In particular, the decoder 130 receives the overall bitstream which is representative of a time domain signal at a sampling rate of fs=fs_in and generates a time domain signal at a sampling rate of 2fs. As a result, a reconstructed audio signal is obtained at the output of the decoder 130, wherein the reconstructed audio signal has an output sampling rate of fs_out=2×fs_in.

In other words, an upsampling of audio signals using Oversampled SBR is proposed. In particular, the upsampling of HE-AACv1 and HE-AACv2 configurations in an audio encoder (e.g. a Dolby Pulse encoder) by a factor of two without the need of a conventional resampler is proposed. For upsampling the audio signals using oversampled SBR, an encoder 250 running in "oversampled SBR mode" (also referred to as an encoder 250 in "upsampled mode") is combined with a decoder 130 running in "dual-rate (normal) SBR mode").

In conventional audio codecs requiring an upsampling, the input audio signal is upsampled (generally speaking, the number of samples is increased) before SBR processing takes place, thereby leading to an upsampled audio signal comprising an increased number of samples. Thus, the SBR encoder needs to perform a high number of additional calculations, thereby increasing the computational complexity of the audio encoder. However, this is not the case for the proposed audio encoding/decoding schemes illustrated in FIG. 2, since no upsampling is done prior to SBR processing. This reduces the complexity of the encoder by at least two measures: on the one hand by avoiding a resampling unit, and on the other hand by performing SBR encoding at a lower sampling rate.

The audio codec 200 provides an inherent upsampling by a factor (or ratio) of two. If upsampling ratios of less than two are required, these can be provided by using a conventional resampler. For upsampling sample rate ratios higher than a factor of two, a conventional resampler may be used for upsampling the audio signal to the next suitable sampling rate (which is half the desired output sampling rate). Subsequently, the audio codec 200 may be used to provide for the remaining upsampling by a factor two. For instance upsampling from 22.05 kHz to 48 kHz may be done by conventionally upsampling from 22.05 Hz to 24 kHz followed by using the audio codec 200 which results in an audio signal having a 48 kHz output sampling rate.

HE-AAC v1 and v2 codecs typically comprise a standardized decoder which is configured to selectively perform decoding in a dual-rate mode (as shown in decoder 130 of FIGS. 1a and 2) or to perform decoding in an oversampled SBR mode, i.e. in a so called "downsampled mode" (as shown in FIG. 1b). The "dual-rate mode" typically is the default mode used by the encoder and the decoder. Therefore, for using a codec 140 in an oversampled SBR mode, explicit SBR signaling is used, in order to tell the decoder to operate in the "downsampled mode". As such, the multiplexed bitstream at the output of the multiplexer 155 needs to provide an indication to the corresponding decoder 170 that the "downsampled mode" is be used. By way of example, MP4 files comprising the multiplexed bitstream include an appropriate indication of the use of "oversampled SBR", e.g. via the parameter "extensionSamplingFrequency" in the AudioSpecificConfig( ). In order to implement the audio codec 200 of FIG. 2, the encoder 250 (working in an "upsampled mode") may be adapted to not include such an indication of the use of "oversampled SBR" into the multiplexed bitstream. By way of example, for MP4 files using explicit SBR signaling the explicit instruction to the decoder to use "downsampled SBR" is not included or removed. Instead, the encoder 250 (in particular the core encoder 252 in conjunction with the SBR encoder 254) may be adapted to insert the indication that the "dual-rate mode" has been used by the encoder 250. Such indication may be provided by appropriately modifying the parameter "extensionSamplingFrequency". As a consequence, the decoder uses (by default) the decoder 130 in dual-rate mode.

As outlined above, the settings of the SBR encoder 254 at the encoder 250 are specified within a parameter tuning table. Typically, an encoder comprises a plurality of such parameter tuning tables, e.g. a first plurality of parameter tuning tables for an encoder 110 in dual-rate mode and a second plurality of parameter tuning tables for an encoder 140 in an upsampled mode (i.e. for an audio codec in an oversampled SBR mode). The parameter tuning tables specify the one or more SBR encoder settings which are to be used (under the one or more constraints defined by the one or more criteria), in order to achieve an optimum encoding result of the audio codec under the one or more constraints. The parameter tuning tables may e.g. be determined using perceptual measurements on a set of listeners. By way of example, a parameter tuning table under the constraints of a predetermined bit rate and the use of a particular encoding mode. Perceptual measurements may be used to determine the SBR encoder settings which achieve the optimum results for a group of listeners. These SBR encoder settings in conjunction with the constraints form a parameter tuning table.

As such, each of the plurality of parameter tuning tables is identified by one or more of the criteria (also referred to as constraints or input parameters): lower target bit rate, higher target bit rate, sampling rate at the core decoder, flag for oversampled SBR and number of channels. Each of the plurality of parameter tuning tables defines a plurality of SBR encoder settings for a corresponding combination of criteria (or constraints). The audio codec 140 in oversampled SBR mode is typically used for relatively high bit rates compared to the audio codec 100 in dual-rate mode. Consequently, the parameter tuning tables which are available for the oversampled SBR mode (i.e. the second plurality of parameter tuning tables) are defined for relatively higher target bit rates than the parameter tuning tables which are available for the dual-rate mode (i.e. the first plurality of parameter tuning tables).

In order to be able to provide an audio codec 200 (which inherently performs upsampling) for a large variety of bit rates (and in particular for relatively low bit rates) and in order to ensure backward compatibility with conventional audio encoders, it is proposed to enable the encoder 150 (working in upsampled mode) to not only use the second plurality of parameter tuning tables (i.e. the parameter tuning tables which are available for the oversampled SBR mode), but to also use the first plurality of parameter tuning tables (i.e. the parameter tuning tables which are available for the dual-rate mode) if—for a given target bit rate—no appropriate parameter tuning table can be found within the second plurality of parameter tuning tables. In other words, it is proposed to use a "dual-rate" SBR parameter tuning table whenever an appropriate "oversampled" SBR parameter tuning table cannot be found. As such, it is ensured that even at low bit rates (and low sampling rates), the SBR parameters settings from the perceptually optimized parameter tuning tables can be used in the audio codec 200. In other words, it is ensured that for additional combinations of bit rate vs. sampling rate, appropriate SBR parameter tuning tables can be provided.

It should be noted that theoretically, new SBR parameter tunings tables could be specifically designed for the audio codec 200 described in the present document. However, if new SBR parameter tuning tables are designed, the encoder 150 could use the new SBR parameter tuning tables for conventional oversampled SBR. This is not desirable, since oversampled SBR was not intended for the kinds of sampling rate/bit rate combinations for which the proposed audio codec 200 is typically used.

The use of a "dual-rate" SBR parameter tuning table in the context of an encoder 250 working in an upsampled mode typically implies that the SBR stopBandFrequency (i.e. the SBR stop frequency) lies around the bandwidth of the output signal of the audio codec 200. Thus, the SBR stopBandFrequency should be adjusted to the bandwidth of the input signal, as otherwise the SBR encoder 254 might operate on empty signal parts, i.e. the SBR encoder 254 might operate on frequency bands which do not comprise any significant energy.

By way of example, an input stereo audio signal may be encoded using a first sampling rate of 22050 Hz. It is selected that an output (or reconstructed) audio signal should have a sampling rate of 48 kHz. Furthermore, the encoded signal should be an HE-AAC bitstream at a target bit rate of 128 kbit/s. In a first step, the encoder may comprise a conventional resampler or upsampler which transforms the input audio signal at 22050 Hz to an audio signal at the signal sampling rate of 24 kHz (i.e. at half of the desired output sampling rate). The remaining upsampling is inherently provided by the codec 200 of FIG. 2.

The encoder 250 of codec 200 operates in an upsampled mode and consequently initially looks for an "oversampled" SBR parameter tuning table which meets the following criteria or encoding conditions:

lower bit rate: <128 kbit/s
upper bit rate: >128 kbit/s
Flag for Oversampled SBR (yes/no?): yes
Sample Rate of the core encoder: 24 kHz
Number of channels: 2
Use of a particular core encoder: e.g. AAC or mp3

The encoder 250 may determine that such a parameter tuning table does not exist (e.g. because the sampling rate is too low for such high bit rates or vice versa for typical applications of oversampled SBR). Consequently, the encoder 250 looks for a "dual-rate" SBR parameter tuning table which meets the above mentioned criteria, i.e. for a parameter tuning table with the same criteria (but without the flag for Oversampled SBR):

lower bit rate: <128 kbit/s
upper bit rate: >128 kbit/s
Flag for Oversampled SBR (yes/no?): no
Sample Rate of the core encoder: 24 kHz
Number of channels: 2
Use of a particular core encoder: e.g. AAC or mp3

This "dual-rate" SBR tuning table may provide a SBR start frequency of 10125 Hz and a SBR stop frequency of 22125 Hz, which together define the frequency interval which is covered by SBR encoding. However, in view of the first sampling rate of 22050 Hz of the input audio signal (i.e. the sampling rate of the input audio signal prior to upsampling), the bandwidth of the input audio signal is only 11025 Hz (=22050 Hz/2). In order to reduce the overall complexity of the encoder 250, it is therefore beneficial to adapt the SBR stop frequency according to the actual bandwidth of the input audio signal. In particular, the SBR stop frequency may be set equal to half the sampling rate of the core encoder (i.e. to 12 kHz). If the encoder 250 is aware of the first sampling rate of the input audio signal (i.e. if the encoder 250 is aware of the upsampling of the input audio signal), the encoder 250 may be adapted to set the SBR stop frequency equal to half the first sampling rate (i.e. to 22050/2 Hz). If the resulting SBR stop frequency would be lower than the SBR start frequency, then the SBR stop frequency should be set in dependence of the SBR start frequency (as outlined above, the SBR stop frequency should be a predetermined number of QMF bands higher than the SBR start frequency, consequently, the SBR stop frequency could be selected to be e.g. 3 QMF bands higher than the SBR start frequency). It should be noted that, typically, the values for the SBR start frequency and the SBR stop frequency can only be modified on a pre-defined frequency grid. As such, the SBR stop frequency is modified in accordance to the pre-defined frequency grid, in order to best approximate (if necessary to higher frequencies) the above mentioned values (i.e. half of the sampling rate of the core encoder, half of the first sampling rate of the input audio signal, or the SBR start frequency).

Figure 3:
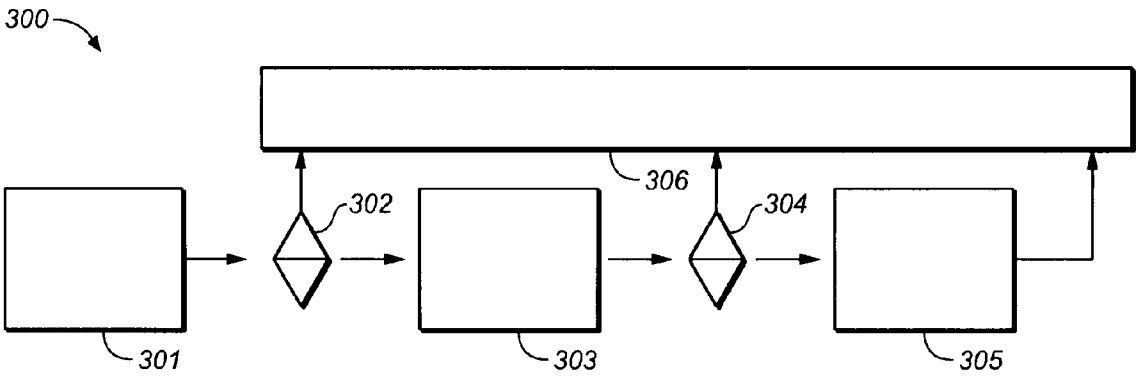
FIG. 3 shows an example flow chart of a method for selecting a parameter tuning table.

FIG. 3 illustrates an example flow chart of a method 300 for selecting an appropriate parameter tuning table at the encoder 250. In step 301, an appropriate parameter tuning table is searched within the plurality of parameter tuning tables for the oversampled SBR mode. An appropriate parameter tuning table is determined such that it meets some or all of the desired criteria (e.g. lower bit rate limit, higher bit rate limit, sampling rate of the core encoder, number of channels) in addition to the criteria that the parameter tuning table has been designed for the oversampled SBR mode. In step 302, it is verified if an appropriate parameter tuning table has been identified. If yes, then this parameter tuning table is used in step 306 to encode the incoming audio signal. If not, then an appropriate parameter tuning table is searched within the plurality of parameter tuning tables for the dual-rate mode (step 303). An appropriate parameter tuning table is determined such that it meets some or all of the desired criteria (e.g. lower bit rate limit, higher bit rate limit, sampling rate of the core encoder, number of channels) but not the criteria that the parameter tuning table has been designed for the oversampled SBR mode. In FIG. 3, it is assumed that an appropriate parameter tuning table can be identified, otherwise the method may enter an error procedure (e.g. explicitly prompt the user for the SBR encoder settings or use default SBR encoder settings). In the optional step 304, it may be verified if the SBR stop frequency in the appropriate parameter tuning table exceeds half of the input sampling rate of the audio signal (or exceeds half of the first sampling rate of the audio signal, if the first sampling rate is known). If no, then the SBR encoder settings of the appropriate parameter tuning table may be used in step 306 for encoding the audio signal. If yes (or—if step 304 is omitted—in any case) in step 305, the SBR stop frequency may be adapted to the bandwidth of the audio signal. In particular, the SBR stop frequency may be adapted to the smaller of half of the input sampling rate of the audio signal or half of the first sampling rate of the audio signal (if it is known that the audio signal has been submitted to prior upsampling). As a further constraint, it may be ensured that the modified SBR stop frequency is a predetermined number of frequency bands higher than the SBR start frequency. It should be noted that the modification to the SBR stop frequency may be constrained to a predetermined frequency grid (e.g. a grid given by QMF frequency bands). The SBR encoder settings from the appropriate parameter tuning table (incl. the modified SBR stop frequency) may be used in step 306 to encode the audio signal.

FIG. 4 illustrates example input and output sampling rates which may be handled by the audio codecs 100, 140 and 200 of FIGS. 1a, 1b, 2. In the chart of FIG. 4, the combinations of input and output sampling rates which are marked as "X" indicate no sampling rate modification or a downsampling. The downsampling may be achieved by a downsampling prior to the audio encoders 110 and 150 of FIGS. 1a and 1b. The combinations of input and output sampling rates which are marked as "Y" indicate an upsampling by a ratio less than two. This upsamling may be achieved by an upsampler prior to the audio encoders 110 and 150 of FIGS. 1a and 1b. The combinations of input and output sampling rates which are marked as "(X)" indicate an upsampling by a ratio of two or more. This upsamling may be achieved by using the audio codec 200 of FIG. 2 which provides for an inherent upsampling by a ratio of two. An additional upsampler may provide for the remaining upsampling (exceeding the ratio of two). As a result, the computational complexity which is required for the total upsampling and for the audio coding/decoding can be reduced.

In the present document, a method and system for audio coding and/or decoding have been described. The method and system allow for the resampling of audio signals at reduced computational complexity. In particular, a modified SBR based audio encoder is described which is based on an SBR based audio encoder in an upsampled mode. A scheme for selecting appropriate SBR encoder settings has been described. The modified SBR based audio encoder is adapted to suppress an indication that the SBR based audio encoder is operating in an upsampled mode. As a result, the corresponding SBR based audio decoder works in a dual-rate mode, thereby providing an inherent upsampling of the decoded audio signal by a factor of two with respect to the input audio signal at the SBR based audio encoder. The overall audio codec (and in particular the audio encoder) may be combined with an upsampler to provide for upsampling ratios greater than two. Overall, the use of inherent upsampling allows reducing the overall computational complexity which is typically required for providing upsampling in relation to audio coding/encoding.

It should be noted that the description and drawings merely illustrate the principles of the proposed methods and systems. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and systems and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The methods and systems described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the internet. Typical devices making use of the methods and systems described in the present document are portable electronic devices or other consumer equipment which are used to store and/or render audio signals.

The invention claimed is:

1. An encoder for an audio signal [at a signal sampling rate], the encoder comprising a core encoder adapted to encode a low frequency component of the audio signal [at the signal sampling rate], thereby generating a core encoded bitstream;

a spectral band replication[, referred to as SBR,] (*SBR*) encoding unit adapted to determine a plurality of SBR parameters subject to one or more SBR encoder settings[;], wherein the plurality of SBR parameters is determined such that a high frequency component of the audio signal at [the] *a* signal sampling rate can be approximated based on the low frequency component of the audio signal and the plurality of SBR parameters; and a multiplexer [adapted to generate] *that generates* an overall bitstream comprising the core encoded bitstream, the plurality of SBR parameters and an indication of the one or more SBR encoder settings applied by [the] *an* SBR encoder; wherein the generated overall bitstream [does not indicate] *indicates* that the core encoded bitstream has been determined by encoding the low frequency component at *a first sampling rate lower than* the signal sampling rate[;], wherein at least one of the core encoder, the SBR encoding unit, or the multiplexer is implemented in hardware or implemented in software and performed by one or more processors comprised in one or more computing devices,

*wherein the SBR encoding unit comprises:*

*an analysis filter bank adapted to provide a plurality of subband signals from the audio signal, and*

*the SBR encoder adapted to:*

*assign a first subset of the plurality of subband signals to the low frequency component,*

*assign a second subset of the plurality of subband signals to the high frequency component, and*

*determine the plurality of SBR parameters from the first and second subsets.*

[2. The encoder of claim 1, wherein the generated overall bitstream indicates that the core encoded bitstream has been determined by encoding the low frequency component at a sampling rate lower than the signal sampling rate.]

3. The encoder of claim 1, wherein the encoder is adapted to encode the overall bitstream in a format which uses explicit SBR signaling.

4. The encoder of claim 3, wherein the explicit SBR signaling is in accordance to ISO/IEC 14496-3.

5. The encoder of claim 4, wherein an AudioSpecificConfig( ) in the overall bitstream does not indicate that the core encoded bitstream has been determined by encoding the low frequency component at the signal sampling rate.

6. The encoder of any of claim 1, wherein the SBR encoding unit is adapted to determine the one or more SBR encoder settings from one of a plurality of parameter tuning tables;

each of the plurality of parameter tuning tables defines the one or more SBR encoder settings in dependence of one or more encoder conditions;

the one or more conditions comprise any one or more of: a lower target bit rate, a higher target bit rate, a sampling rate used by the core encoder, a number of channels comprised within the audio signal, an indication of the use of an oversampled encoding mode instead of a dual-rate mode;

in the oversampled encoding mode, the core encoder encodes the low frequency component of the audio signal at the signal sampling rate; and in the dual-rate encoding mode, the core encoder encodes the low frequency component of the audio signal at half the signal sampling rate.

7. The encoder of claim 6, wherein the overall bitstream does not indicate that the encoder has used the oversampled encoding mode to generate the overall bitstream.

8. The encoder of any of claim 6, wherein the overall bitstream indicates that the encoder has used the dual-rate encoding mode to generate the overall bitstream.

9. The encoder of claim 6, wherein the SBR encoding unit is adapted to use a dual-rate parameter tuning table from the plurality of parameter tuning tables; *and* the dual-rate parameter tuning table is defined for the encoder condition indicating the use of the dual-rate encoding mode.

10. The encoder of claim 9, wherein the dual-rate parameter tuning table is defined for the encoder condition that the sampling rate used by the core encoder corresponds to the signal sampling rate;

the dual-rate parameter tuning table defines a dual-rate SBR stop frequency; *and* the one or more SBR encoder settings which are used to determine the plurality of SBR parameters comprise a SBR stop frequency which corresponds to a value which is smaller than the dual-rate SBR stop frequency.

11. The encoder of claim 10, wherein the dual-rate parameter tuning table defines a dual-rate SBR start frequency; and the one or more SBR encoder settings used to determine the plurality of SBR parameters comprise a SBR start frequency which corresponds to the dual-rate SBR start frequency.

12. The encoder of claim 11, wherein the low frequency component comprises frequencies of the audio signal below the SBR start frequency; and the high frequency component comprises frequencies of the audio signal above the SBR start frequency.

13. The encoder of claim 1, further comprising:

an upsampling unit adapted to upsample the audio signal at [a] *the* first sampling rate to provide the audio signal at the signal sampling rate[; wherein the first sampling rate is smaller than the signal sampling rate].

14. The encoder of claim 13, wherein the one or more SBR encoder settings comprise a SBR stop frequency determined based on the first sampling rate.

15. The encoder of claim 14, wherein the SBR stop frequency is determined on a pre-determined frequency grid; and equal to a frequency on the frequency grid.

[16. The encoder of claim 1, wherein the SBR encoding unit comprises an analysis filter bank adapted to provide a plurality of subband signals from the audio signal; and an SBR encoder adapted to assign a first subset of the plurality of subband signals to the low frequency component;

assign a second subset of the plurality of subband signals to the high frequency component; and determine the plurality of SBR parameters from the first and second subsets.]

17. The encoder of claim 1, wherein the one or more SBR encoder settings comprise any one or more of:

an SBR start frequency, wherein the SBR encoding unit is restricted to determine the plurality of SBR parameters for frequencies of the high frequency component which are at or above the SBR start frequency; and an SBR stop frequency, wherein the SBR encoding unit is restricted to determine the plurality of SBR parameters for frequencies of the high frequency component which are at or below the SBR stop frequency.

18. The encoder of claim 1, wherein the multiplexer includes a value for an extension SamplingFrequency into an AudioSpecificConfig( ) data entity of the bitstream and joins the plurality of SBR parameters and the core encoded bitstream of the low frequency component to provide the overall bitstream, which is stored, in a non-transitory medium, or which is transmitted.

19. A high efficiency advanced audio coding[, referred to as HE-AAC,] (*HE-AAC*) encoder operating in an oversampled spectral band replication[, referred to as SBR,] (*SBR*) mode, wherein the *HE-ACC* encoder [is adapted to generate] *generates* an overall bitstream comprising a core encoded bitstream, a plurality of SBR parameters and an indication of [the] one or more SBR encoder settings used to determine the SBR parameters; and the generated overall bitstream [does not indicate] *indicates* that the encoder operates in the [oversampled SBR] mode *in which a low frequency component of an audio signal is encoded at a first sampling rate that is lower than a signal sampling rate associated with a high frequency component of the audio signal*, wherein the encoder is implemented in hardware or implemented in software and performed by one or more processors comprised in one or more computing devices,

*wherein the HE-AAC encoder comprises:*

*an analysis filter bank adapted to provide a plurality of subband signals from the audio signal, and*

*an SBR encoder adapted to:*

*assign a first subset of the plurality of subband signals to the low frequency component,*

*assign a second subset of the plurality of subband signals to the high frequency component, and*

*determine the plurality of SBR parameters from the first and second subsets.*

20. The encoder of claim 19, wherein the generated overall bitstream indicates that the encoder operates in a dual-rate mode.

21. A method for encoding an audio signal [at a signal sampling rate], the method comprising:

encoding, at a core encoder, a low frequency component of the audio signal [at the signal sampling rate], thereby generating a core encoded bitstream;

determining, at a spectral band replication (*SBR*) encoding unit, a plurality of [spectral band replication, referred to as SBR,] *SBR* parameters subject to one or more SBR encoder settings[;], wherein the plurality of SBR parameters is determined such that a high frequency component of the audio signal at [the] *a* signal sampling rate can be approximated based on the low frequency component of the audio signal and the plurality of SBR parameters; and generating, at a multiplexer, an overall bitstream comprising the core encoded bitstream, the plurality of SBR parameters and an indication of the one or more SBR encoder settings; wherein the generated overall bitstream [does not indicate] *indicates* that the core encoded bitstream has been determined by encoding the low frequency component at *a first sampling rate lower than* the signal sampling rate[;], wherein at least one of the core encoder, the SBR encoding unit, or the multiplexer is implemented in hardware or implemented in software and performed by one or more processors comprised in one or more computing devices*, and*

*wherein the SBR encoding unit comprises:*

*an analysis filter bank adapted to provide a plurality of subband signals from the audio signal, and*

*an SBR encoder adapted to:*

*assign a first subset of the plurality of subband signals to the low frequency component,*

*assign a second subset of the plurality of subband signals to the high frequency component, and*

*determine the plurality of SBR parameters from the first and second subsets.*

22. A non-transitory computer readable medium configured to store instructions corresponding to the method steps of claim 21.

23. A method for upsampling an audio signal [at a signal sampling rate], the method comprising*:* encoding, at a core encoder, a low frequency component of the audio signal [at the signal sampling rate], thereby generating a core encoded bitstream;

determining, at a spectral band replication (*SBR*) encoding unit, a plurality of [spectral band replication, referred to as SBR,] *SBR* parameters subject to one or more SBR encoder settings[;], wherein the plurality of SBR parameters is determined such that a high frequency component of the audio signal at [the signal sampling rate] can be approximated based on the low frequency component of the audio signal and the plurality of SBR parameters;

generating, at a core decoder, a reconstructed low frequency component at [the signal] *a first* sampling rate from the core encoded bitstream;

generating, at an analysis filter bank, N subband signals of the reconstructed low frequency component; generating, at a SBR decoder, N subband signals of a reconstructed high frequency component based on the N subband signals of the reconstructed low frequency component, based on the plurality of SBR parameters and based on the one or more SBR encoder settings; and generating, at a synthesis filter bank, a reconstructed audio signal at [twice the signal] *a second* sampling rate from the N subband signals of the reconstructed low frequency component and from the N subband signals of the reconstructed high frequency component[;], wherein at least one of the core encoder, the SBR encoding unit, the core decoder, the analysis filter bank, the SBR decoder or the synthesis filter bank is implemented in hardware, wherein the method is performed by one or more processors comprised in one or more computing devices*, and*

*wherein the SBR encoding unit comprises:*

*an analysis filter bank adapted to provide a plurality of subband signals from the audio signal, and*

*an SBR encoder adapted to:*

*assign a first subset of the plurality of subband signals to the low frequency component,*

*assign a second subset of the plurality of subband signals to the high frequency component, and*

*determine the plurality of SBR parameters from the first and second subsets.*

24. A non-transitory computer readable medium configured to store instructions corresponding to the method steps of claim 23.

* * * * *